United States Patent
Hsu et al.

(10) Patent No.: US 9,274,988 B2
(45) Date of Patent: Mar. 1, 2016

(54) MODE SWITCHING METHOD OF ELECTRONIC DEVICE AND ASSOCIATED ELECTRONIC DEVICE

(71) Applicant: Realtek Semiconductor Corp., HsinChu (TW)

(72) Inventors: Chin-Yu Hsu, Yilan County (TW); Yi-Huai Chen, Taoyuan County (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 0 days.

(21) Appl. No.: 13/745,865

(22) Filed: Jan. 21, 2013

(65) Prior Publication Data

US 2014/0059254 A1 Feb. 27, 2014

(30) Foreign Application Priority Data

Aug. 24, 2012 (TW) .............................. 101130781 A

(51) Int. Cl.
*G06F 3/00* (2006.01)
*G06F 13/24* (2006.01)
*G06F 13/00* (2006.01)
*G06F 13/38* (2006.01)
G06F 3/06 (2006.01)

(52) U.S. Cl.
CPC ............ *G06F 13/385* (2013.01); *G06F 3/0634* (2013.01)

(58) Field of Classification Search
CPC .............................. G06F 1/385; G06F 3/06343
USPC ......................................... 710/14, 8, 261, 361
See application file for complete search history.

(56) References Cited

U.S. PATENT DOCUMENTS

| | | | | |
|---|---|---|---|---|
| 6,085,277 A * | 7/2000 | Nordstrom et al. | ........... | 710/263 |
| 7,039,738 B2 * | 5/2006 | Plummer et al. | ............. | 710/260 |
| 7,058,836 B2 * | 6/2006 | Bormann et al. | ............. | 713/340 |
| 7,069,456 B2 * | 6/2006 | Bormann et al. | ............. | 713/340 |
| 7,107,379 B2 * | 9/2006 | Bauerfeind et al. | ........... | 710/300 |
| 7,120,709 B2 * | 10/2006 | Isobe et al. | ........................ | 710/38 |
| 7,174,397 B2 * | 2/2007 | Tomiyasu | ........................ | 710/62 |
| 7,209,982 B2 * | 4/2007 | Nakanishi | ........................ | 710/38 |
| 7,269,630 B2 | 9/2007 | Abbondanzio | | |
| 7,328,333 B2 | 2/2008 | Kawano | | |
| 7,380,039 B2 * | 5/2008 | Miloushev et al. | ........... | 710/244 |
| 7,886,136 B2 * | 2/2011 | Yoon | ................. | 713/1 |
| 8,321,617 B1 * | 11/2012 | Haga | ........................... | 710/302 |
| 8,595,533 B2 * | 11/2013 | Lin et al. | ........................ | 713/324 |
| 2006/0085583 A1 * | 4/2006 | Yu et al. | ........................ | 710/301 |
| 2008/0276012 A1 * | 11/2008 | Mesa et al. | ........................ | 710/13 |
| 2009/0307380 A1 * | 12/2009 | Lee et al. | ........................ | 710/14 |
| 2011/0258348 A1 * | 10/2011 | Wee et al. | ........................ | 710/14 |
| 2012/0179845 A1 * | 7/2012 | Nie et al. | ........................ | 710/14 |

FOREIGN PATENT DOCUMENTS

TW       I328743       8/2010

* cited by examiner

*Primary Examiner* — Idriss N Alrobaye
*Assistant Examiner* — Getente A Yimer
(74) *Attorney, Agent, or Firm* — Winston Hsu; Scott Margo

(57) ABSTRACT

A mode switch method of an portable electronic device includes: when the electronic device is electrically connected to a host, setting the electronic device to start to be operated under a first mode; when the host has installed a operating system, detecting whether the host has a driver of the electronic device or not; when the host has the driver of the electronic device, the electronic device continues to be operated under the first mode; and when the host does not have the driver of the electronic device, switching the electronic device to be operated under a second mode.

14 Claims, 3 Drawing Sheets

MODE SWITCHING METHOD OF ELECTRONIC DEVICE AND ASSOCIATED ELECTRONIC DEVICE

BACKGROUND OF THE INVENTION

1. Field of the Invention

The present invention is related to an electronic device, and more particularly, to a mode switching method of an electronic device with multiple functions and the related electronic device.

2. Description of the Prior Art

The universal serial bus (USB) is a very popular device interface nowadays, and many electronic devices employ this kind of device interface. However, drivers of some USB devices are not built in the operation system employed by the host. Therefore, the user needs to install the driver to the host first and then uses the USB device via the host, which limits the convenience of using the USB device.

To solve the aforementioned driver installation problem, a composite USB device is developed. The composite USB device includes many functions, where one function is to make the composite USB device simulate a storage device to be used as the installation source of the driver, so that the host can install the driver needed by the composite USB device when the composite USB device is connected to the host. However, no matter whether the host has installed the driver, each time the composite USB device is connected to the host, a pop-up window will be displayed on the screen to ask the user whether to install the driver. Hence, it would be inconvenient for the user to manually close this pop-up window.

SUMMARY OF THE INVENTION

Therefore, an objective of the present invention is providing a mode switching method of the electronic device which can avoid the display of a pop-up driver installation window when the host has already installed the driver, to solve the aforementioned problem.

According to an embodiment of the present invention, a mode switching method of an electronic device includes: when the electronic device is electrically connected to a host, the electric device is set to operate in a first mode; when the host has an operating system, detecting whether the host has installed a driver of the electric device; when the host has installed the driver, maintaining the electric device in the first mode; and when the host does not have the driver, switching the electric device to a second mode.

According to another embodiment of the present invention, an electric device includes a storage unit and a controller, where the storage unit is used to store a driver. When the electronic device is electrically connected to a host, the controller sets the electronic device to start operating in a first mode; when the host has installed an operating system, the controller detects whether the host has installed a driver of the electronic device; when the host has the driver, the controller remains the electric device in the first mode; and when the host does not have the driver, the controller switches the electric device to a second mode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
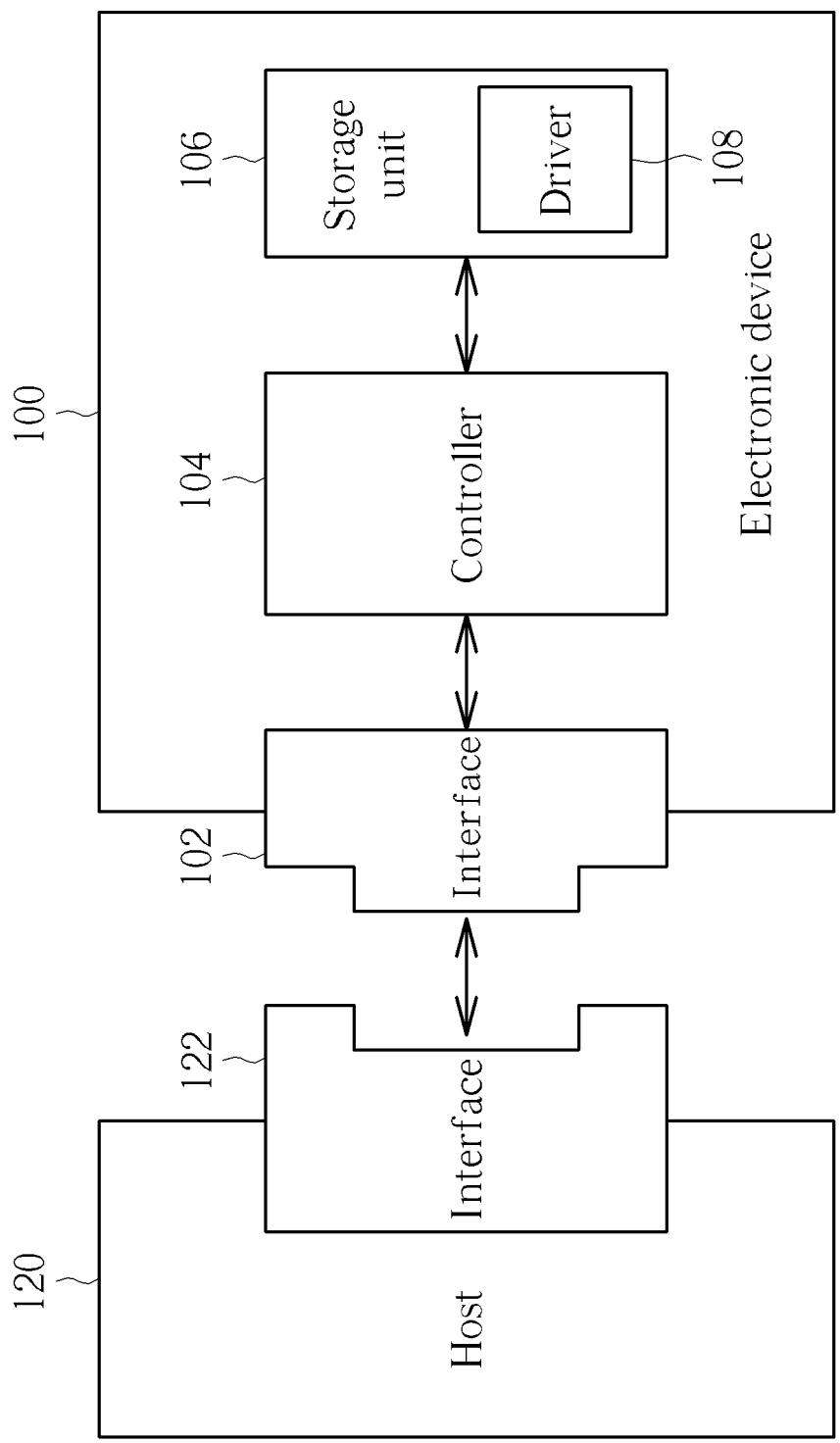
FIG. 1 is a diagram illustrating an electronic device according to an embodiment of the present invention.

Please refer to FIG. 1, which is a diagram illustrating an electronic device 100 according to an embodiment of the present invention. As shown in FIG. 1, the electronic device 100 includes an interface 102, a controller 104 and a storage unit 106, where the interface 102 is used to electrically connect to an interface 122 of a host 120, and the storage unit 106 stores a driver 108 to be installed in the host 120. In this embodiment, the electronic device 100 is an universal serial bus (USB) electronic device, the interface 102 is an USB interface, the electronic device 100 supports multiple functions and the interface 102 also supports the corresponding multiple functions; besides, the host 120 can be any host having an operating system and supporting the USB function, like a desktop computer, a notebook, a tablet, etc., and the interface 122 is also a USB interface.

Additionally, in an embodiment, the electronic device 100 may be a USB network adapter and support at least the network function and the storage device function. That is, the electronic device 100 can provide network communication and related functions to the host 120, and can also be taken as a storage device by the host 120.

Figure 2:
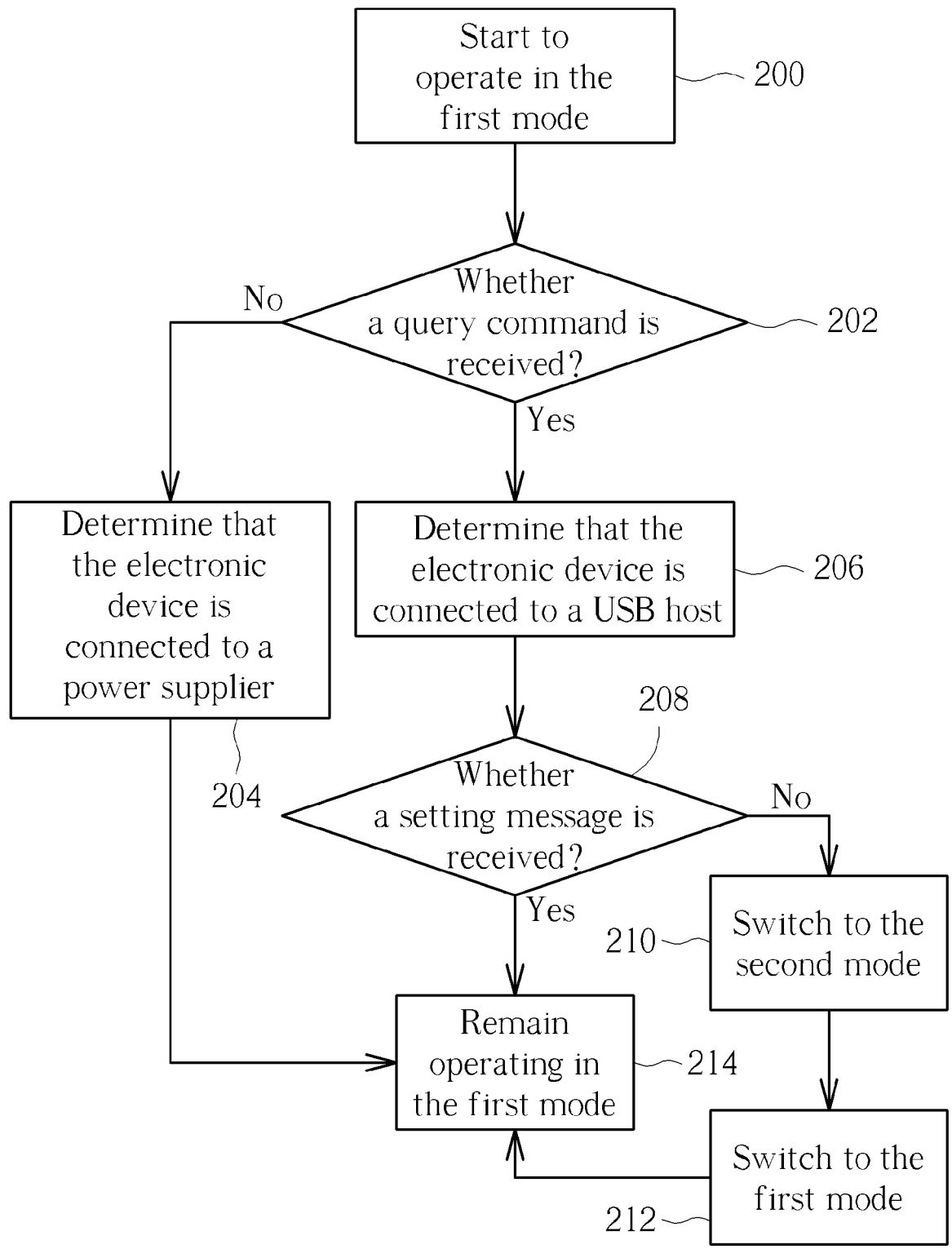
FIG. 2 is a flowchart illustrating a mode switching method of the electronic device according to an embodiment of the present invention.

Please refer to FIG. 2, which is a flowchart illustrating a mode switching method of the electronic device 100 according to an embodiment of the present invention, where the flowchart shown in FIG. 2 is the operation of the electronic device 100 after the electronic device 100 is just plugged into the host 120, or the operation of the electronic device 100 after the host 120 reboots under the condition that the electronic device 100 has been plugged into the host 120. Additionally, the flowchart shown in FIG. 2 is performed by the controller 104 according to hardware or software (firmware). Referring to FIG. 1 and FIG. 2, the flowchart is described in the following.

At first, in step 200, when the electronic device 100 is just plugged into the host 120 or when the host 120 reboots under the condition that the electronic device 100 is already plugged into the host 120, the controller 104 would set the electronic device 100 to directly operate in a first mode. In this embodiment, it is assumed that the electronic device 100 supports two functions, such as the network function and the storage device function. Hence, the first mode can be a network function mode in this case. Besides, the electronic device 100 does not operate in a second mode at this moment, that is, the storage device function supported by the electronic device 100 is not enabled at this moment.

Next, in step 202, the controller 104 detects whether a query command is received from the host 120, where the query command is a command particularly transmitted to the electronic device 100 for querying information such as a product identification (PID), a vendor identification (VID), a class, a sub-class, etc. For example, the query command can be a device descriptor DEVICE_DESCRIPTOR as defined in the query type control transfer of the USB specification. In an embodiment, the controller 104 can determine whether the query command is received from the host 120 by checking if the query command is received within a predetermined time (e.g., 3 seconds). If the controller 104 receives the query command from the host 120, it means that the host 120 has the operating system installed therein and is a USB host. Hence, the flow goes to step 206 to determine that the electronic device 100 is indeed connected to an USB host having the operating system installed therein. However, if the controller 104 does not receive the query command from the host 120, it means that the host 120 does not have the operating system installed therein, and the electronic device 100 is probably merely connected to a power supplier. Hence, the flow goes to step 204 to determine that the electronic device 100 is connected to a power supplier, and then goes to step 214 to make the electronic device 100 remain operating in the first mode.

After the flow proceeds with step 206 to determine that the electronic device 100 is indeed connected to a USB host having the operating system installed therein, the flow goes to step 208 to determine whether a setting message is received from the host 120, where the setting message is a message which is transmitted to the electronic device 100 only when the host 120 has the driver of the electronic device 100. For example, the setting message can be a set configuration SET_CONFIGURATION as defined in the set type control transfer of the USB specification. In an embodiment, the controller 104 can determine whether the setting message is received from the host 120 by checking if the setting message is received within a predetermined time (e.g., 3 seconds). If the controller 104 receives the setting message from the host 120, it means that the host 120 has the driver of the electronic device 100, and thus the flow goes to step 214 to remain operating in the first mode. However, if the controller 104 does not receive the setting message from the host 120, the flow goes to step 210.

In step 210, the controller 104 switches the electronic device 100 to operate in the second mode, where the second mode is the storage device mode. When the electronic device 100 operates in the second mode, a new window (not shown) will be displayed on the screen of the host 120 for allowing the use to enable the installation of the driver. After the host 120 uses the driver 108 in the electronic device 100 to complete the installation of the driver, the host 120 will transmit a specific command to the electronic device 100 to inform that the host 120 has completed the installation of the driver. Therefore, the controller 104 can determine whether the host 120 has completed the installation of the driver by checking if the specific command is received from the host 120. After the controller 104 determines that the host 120 has completed the installation of the driver, the electronic device 100 is switched to operate in the first mode, and then the flow goes to step 214 to make the electronic device 100 remain operating in the first mode.

As mentioned above, although the electronic device 100 supports two functions, the storage device function is not enabled in the beginning. Specifically, the storage device function is not enabled for allowing the user to use the driver 108 stored in the electronic device 100 to accomplish the driver installation until the controller 104 determines that the host 120 does not have the driver of the electronic device 100. Compared to the prior art, the present invention therefore can prevent the user from closing the pop-up driver installation window each time the electronic device is powered on, thus improving the convenience for the user.

Additionally, when the host 120 supports the USB flash disk booting function, the basic input/output system (BIOS) in the host 120 can also support the USB device. Therefore, when the host 120 reboots under the condition that the electronic device 100 has been plugged into the host 120, because the BIOS operates first, the electronic device 100 will take BIOS as a USB host and make the electronic device 100 follow successive steps 200, 202, 206, 208 shown in FIG. 2 to enter step 210 such that the electronic device 100 operates in the second mode (storage device mode). After the operating system of the host 120 completes the booting regularly, because the electronic device 100 has operated in the second mode (storage device mode), a pop-up window would still be displayed on the screen of the host 120 to ask the user about whether the driver is needed to be installed. Hence, the user needs to close the pop-up window, resulting in inconvenience for the user.

Figure 3:
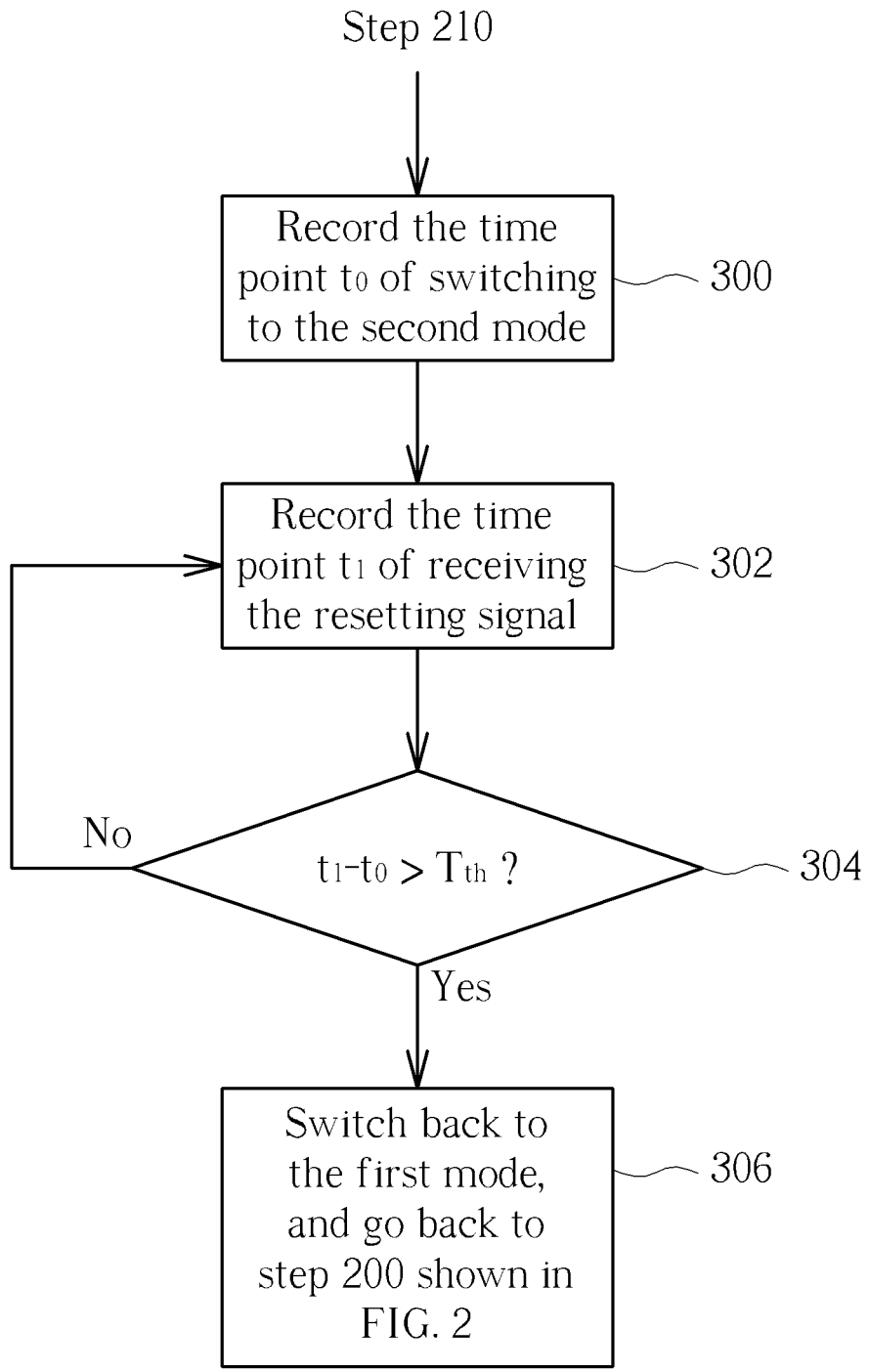
FIG. 3 is a flowchart illustrating the step of determining whether the electronic device is switched to the second mode under the operation of the operating system according to an embodiment of the present invention.

To solve this problem, please refer to FIG. 3, which is a flowchart illustrating the step of determining whether the electronic device is switched to the second mode (storage device mode) under the operation of the operating system according to an embodiment of the present invention. The flow shown in FIG. 3 is performed immediately after step 210 shown in FIG. 2. That is, after step 210 is entered, besides waiting for the completion of the driver installation to go to step 212, the flow also goes to step 300 shown in FIG. 3 automatically. Referring to FIG. 1-FIG. 3 together, the flow is summarized as follows.

In step 300, the controller 104 records the time point $t_0$ that the electronic device 100 is switched to the second mode (that is, the time point of going to step 210 shown in FIG. 2). Next, in step 302, the controller 104 waits for a resetting signal, and records the time point $t_1$ of receiving the resetting signal. In this embodiment, the resetting signal is a command signal corresponding to the electronic device 100 that is immediately generated when the operating system of the host 120 detects the electronic device 100. Besides, the resetting signal can also be a command signal immediately generated when the operating system of the host 120 performs the operating system switching, interface switching or the mode switching of the electronic device 100.

Next, in step 304, a time difference between the time point $t_0$ at which the electronic device 100 is switched to the second mode and the time point $t_1$ of receiving the resetting signal is calculated and compared with a threshold value $T_{th}$, to thereby determine whether the electronic device 100 is switched to the second mode under the operation of the operating system of the host 120. In detail, because the resetting signal is transmitted when the operating system of the host 120 detects the electronic device 100, if the electronic device 100 is switched to the second mode under the operation of the operating system of the host 120, the time difference $(t_1-t_0)$ should be very short. However, if the electronic device 100 is switched to the second mode under the operation of the BIOS, the time difference would be very long because the time difference $(t_1-t_0)$ is close to the booting time of the host 120. As mentioned above, if step 304 determines that the time difference $(t_1-t_0)$ is smaller than the threshold value $T_{th}$ (the threshold value $T_{th}$ can be any preset value (e.g., i.e. 5-10 seconds) smaller than the booting time of the host 120), this implies the electronic device 100 is switched to the second mode under the operation of the operating system of the host 120, and thus the flow goes back to step 302. However, if step 304 determines that the time difference $(t_1-t_0)$ is larger than the threshold value $T_{th}$, this implies the electronic device 100 is switched to the second mode under the operation of BIOS rather than the operation of the operating system of the host 120, and thus the flow goes to step 306.

In step 306, the controller 104 switches the electronic device 100 back to the first mode, and the flow goes back to step 200 shown in FIG. 2 to restart the flow shown in FIG. 2.

Besides, it should be noted that the flow shown in FIG. 3 is only for illustrative purposes, and not meant to be a limitation to the present invention. In other embodiment of the present invention, the controller 104 can also determine whether the electronic device 100 is switched to the second mode under the operation of the operating system of the host 120 by using other determining methods, and accordingly determine whether the flow shown in FIG. 2 should be restarted.

In summary, the mode switching method of the electronic device of the present invention is applied to a multi-function USB device, and is capable of determining whether the electronic device enters the storage device mode by checking if the host has the driver installed. In this way, the pop-up driver installation window displayed on the screen each time the user connects the electronic device to the host can be avoided, thus improving the convenience for the user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A mode switching method of an electronic device, comprising:
    setting the electronic device to start operating in a first mode when the electronic device is electrically connected to a host;
    detecting whether the host has a driver of the electronic device installed therein or not, by the electronic device, when the host has an operating system installed therein;
    maintaining the electronic device to be operated in the first mode when the electronic device determines that the host has the driver installed therein;
    switching the electronic device to be operated in a second mode when the electronic device determines that the host does not have the driver installed therein; and
    after switching the electronic device to the second mode:
        determining whether the electronic device is switched to the second mode under an operation of the operating system of the host;
        maintaining the electronic device in the second mode when the electronic device is switched to the second mode under the operation of the operating system of the host; and
        when the electronic device is not switched to the second mode under the operation of the operating system of the host, switching the electronic device to the first mode, and determining whether the host has the driver of the electronic device installed therein to decide whether to maintain the electronic device in the first mode or switch the electronic device to the second mode again for installation of the driver;
    wherein the second mode is a storage device mode for installation of the driver;
    wherein the step of determining whether the electronic device is switched to the second mode under the operation of the operating system of the host comprises:
        recording a time point at which the electronic device is switched to the second mode;
        receiving a resetting signal from the host and recording a time point at which the resetting signal is received; and
        determining whether the electronic device is switched to the second mode under the operation of the operating system of the host according to the time point at which the electronic device is switched to the second mode and the time point at which the resetting signal is received;
    wherein the step of determining whether the electronic device is switched to the second mode under the operation of the operating system of the host comprises: referring to a time difference between the time point at which the electric device is switched to the second mode and the time point at which the resetting signal is received to determine whether the electronic device is switched to the second mode under the operation of the operating system of the host;
        determining that the electronic device is not switched to the second mode under the operation of the operating system of the host when the time difference is lamer than a threshold value; and
        determining that the electronic device is switched to the second mode under the operation of the operating system of the host when the time difference is smaller than a threshold value.

2. The mode switching method of claim 1, wherein the electronic device is a universal serial bus (USB) electronic device, the electronic device has a plurality of functions, and the first mode and the second mode correspond to different functions in the electronic device.

3. The mode switching method of claim 2, wherein the electronic device is a USB network adapter, the first mode is a network function mode.

4. The mode switching method of claim 1, further comprising:
    detecting whether the host has the operating system installed therein; and
    maintaining the electronic device in the first mode when the host does not have the operating system installed therein.

5. The mode switching method of claim 4, wherein the step of detecting whether the host has the operating system installed therein comprise:
    determining whether a query command from the host is received during a predetermined time period;
    determining that the host has the operating system installed therein when the query command from the host is received during the predetermined time period; and
    determining that the host does not have the operating system installed therein when the query command from the host is not received during the predetermined time period.

6. The mode switching method of claim 1, wherein the step of detecting whether the host has the driver of the electronic device installed therein comprise:
    determining whether a setting message from the host is received during a predetermined time period;
    determining that the host has the driver installed therein when the setting message from the host is received during the predetermined time period; and
    determining that the host does not have the driver installed therein when the setting message from the host is not received during the predetermined time period.

7. The mode switching method of claim 1, wherein the driver is stored in the electronic device, and the mode switching method further comprises:
    after switching the electronic device to the second mode:
        receiving a specific command from the host to determine whether the host has utilized the driver stored in the electronic device to complete installation of the driver, and accordingly determining whether to switch the electronic device back to the first mode.

8. The mode switching method of claim 1, wherein the resetting signal is a command signal corresponding to the electronic device that is immediately generated when the host detects the electronic device.

9. An electronic device, comprising:
a storage unit, arranged for storing a driver;
a controller, coupled to the storage unit;
wherein the controller controls the electronic device to start operating in a first mode when the electronic device is electrically connected to a host; the controller detects whether the host has the driver of the electronic device installed therein or not when the host has an operating system installed therein; the controller maintains the electronic device to be operated in the first mode when the controller determines that the host has the driver installed therein; and the controller switches the electronic device to be operated in a second mode when the controller determines that the host does not have the driver installed therein; wherein the second mode is a storage device mode for installation of the driver;
wherein after switching the electronic device to the second mode, the controller determines whether the electronic device is switched to the second mode under an operation of the operating system of the host; and the controller maintains the electronic device in the second mode when the electronic device is switched to the second mode under the operation of the operating system of the host, and switches the electronic device to the first mode when the electronic device is not switched to the second mode under the operation of the operating system of the host;
wherein after switching the electronic device to the first mode due to that the electronic device is not switched to the second mode under the operation of the operating system of the host, the controller determines whether the host has the driver of the electronic device installed therein to decide whether to maintain the electronic device in the first mode or switch the electronic device to the second mode again for installation of the driver;
wherein the controller records a time point at which the electronic device is switched to the second mode, and records a time point at which a resetting signal is received from the host; and the controller refers to the time point at which the electronic device is switched to the second mode and the time point at which the resetting signal is received to determine whether the electronic device is switched to the second mode under the operation of the operating system of the host;
wherein determining whether the electronic device is switched to the second mode under the operation of the operating system of the host comprises: the controller referring to a time difference between the time point at which the electric device is switched to the second mode and the time point at which the resetting signal is received to determine whether the electronic device is switched to the second mode under the operation of the operating system of the host;
the controller determining that the electronic device is not switched to the second mode under the operation of the operating system of the host when the time difference is lamer than a threshold value; and
the controller determining that the electronic device is switched to the second mode under the operation of the operating system of the host when the time difference is smaller than a threshold value.

10. The electronic device of claim 9, wherein the electronic device is a universal serial bus (USB) electronic device, the electronic device has a plurality of functions, and the first mode and the second mode correspond to different functions in the electronic device.

11. The electronic device of claim 10, wherein the electronic device is a USB network adapter, the first mode is a network function mode.

12. The electronic device of claim 9, wherein the controller further detects whether the host has the operating system installed therein; and the controller maintains the electronic device in the first mode when the host does not have the operating system installed there.

13. The electronic device of claim 9, wherein the controller determines whether a setting message from the host is received during a predetermined time period; and determines that the host has the driver program installed therein after receiving the setting message from the host.

14. The electronic device of claim 9, wherein after switching the electronic device to the second mode, the controller receives a specific command from the host to determine whether the host has utilized the driver stored in the electronic device to complete installation of the driver, and accordingly determines whether to switch the electronic device back to the first mode.

* * * * *